United States Patent
Aronu et al.

(10) Patent No.: US 10,413,860 B2
(45) Date of Patent: Sep. 17, 2019

(54) ABSORBENT SYSTEM AND METHOD FOR CAPTURING $CO_2$ FROM A GAS STREAM

(71) Applicant: SINTEF TTO AS, Trondheim (NO)

(72) Inventors: Ugochukwu E. Aronu, Trondheim (NO); Inna Kim, Trondheim (NO); Karl Anders Hoff, Trondheim (NO); Aslak Einbu, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 15/318,228

(22) PCT Filed: Jun. 12, 2015

(86) PCT No.: PCT/NO2015/050106
§ 371 (c)(1),
(2) Date: Dec. 12, 2016

(87) PCT Pub. No.: WO2015/190936
PCT Pub. Date: Dec. 17, 2015

(65) Prior Publication Data
US 2017/0106331 A1 Apr. 20, 2017

Related U.S. Application Data

(60) Provisional application No. 62/011,790, filed on Jun. 13, 2014.

(51) Int. Cl.
*B01D 53/14* (2006.01)
*C10K 1/14* (2006.01)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC ........... B01D 2252/20421; B01D 2252/20426; B01D 2252/20431; B01D 2252/20484;
(Continued)

(56) References Cited

U.S. PATENT DOCUMENTS

| 2006/0117954 | A1 | 6/2006 | Versteeg et al. |
| 2012/0051989 | A1* | 3/2012 | Wagner .............. B01D 53/1456 423/210 |

(Continued)

FOREIGN PATENT DOCUMENTS

| EP | 2 311 545 | 4/2011 |
| EP | 2 514 507 | 10/2012 |

(Continued)

OTHER PUBLICATIONS

International Search Report dated Sep. 4, 2015 in International Application No. PCT/NO2015/050106.

(Continued)

*Primary Examiner* — Cabrena Holecek
(74) *Attorney, Agent, or Firm* — Wenderoth, Lind & Ponack, L.L.P.

(57) ABSTRACT

The present invention relates to an absorbent, an absorbent system and a process for removing acidic gas such as $CO_2$ from exhaust gases from fossil fuel fired power stations, from natural gas streams, from blast furnace oven off-gases in iron/steel plants, from cement plant exhaust gas and from reformer gases containing $CO_2$ in mixtures with $H_2S$ and COS. The liquid absorbent, a mixture of amine and amino acid salt is contacted with a $CO_2$ containing gas in an absorber and $CO_2$ in the gas stream is absorbed into the liquid. The absorbed $CO_2$ forms more than one type of solid precipitate in the liquid at different absorption stages. In a first absorption stage solid precipitate of amine bicarbonate is formed and is withdrawn as slurry from the bottom of a (Continued)

first absorber section. In a second absorption stage solid precipitate of alkali metal bicarbonate is formed and withdrawn as slurry at the bottom of a second absorber section. The slurry withdrawn from the first absorption section is heated to dissolve the precipitate with $CO_2$ release in an amine flash regeneration tank. The slurry from the second precipitation stage is withdrawn from the bottom of the second absorber section and sent to a regenerator for desorption with $CO_2$ release. The lean amine and amino acid salt mixture from the flash regenerator and desorber are mixed and returned to the top of the absorber. This absorbent system improves carbon dioxide removal efficiency due to its higher $CO_2$ removal ability per cycle when compared with conventional amine, absorbent from organic acid neutralized with inorganic base and carbonate based absorbent system. It exhibits less solvent vaporization loss because part of the absorbent is in salt form.

6 Claims, 3 Drawing Sheets

(52) U.S. Cl.
CPC .... *C10K 1/143* (2013.01); *B01D 2252/20421* (2013.01); *B01D 2252/20426* (2013.01); *B01D 2252/20431* (2013.01); *B01D 2252/20484* (2013.01); *B01D 2252/20489* (2013.01); *B01D 2252/20494* (2013.01); *B01D 2252/504* (2013.01); *Y02C 10/04* (2013.01); *Y02C 10/06* (2013.01); *Y02P 20/152* (2015.11)

(58) Field of Classification Search
CPC ........... B01D 2252/20489; B01D 2252/20494; B01D 2252/504; B01D 53/1425; B01D 53/1475; B01D 53/1493; C10K 1/143; Y02C 10/04; Y02C 10/06; Y02P 20/152
See application file for complete search history.

(56) References Cited

U.S. PATENT DOCUMENTS

| | | | |
|---|---|---|---|
| 2012/0060689 A1* | 3/2012 | Naumovitz | B01D 53/1425 95/165 |
| 2013/0139695 A1 | 6/2013 | Chang et al. | |
| 2013/0203155 A1* | 8/2013 | Penders | B01D 53/1425 435/266 |
| 2015/0044114 A1 | 2/2015 | Murai et al. | |

FOREIGN PATENT DOCUMENTS

| | | |
|---|---|---|
| EP | 2 835 170 | 2/2015 |
| WO | 03/095071 | 11/2003 |
| WO | 2010/053377 | 5/2010 |
| WO | 2012/030630 | 3/2012 |
| WO | 2012/055035 | 5/2012 |

OTHER PUBLICATIONS

International Preliminary Report on Patentability dated May 24, 2016 in International Application No. PCT/NO2015/050106 and Applicant's Response.

Ugochukwu E. Aronu et al., "Understanding Precipitation in Amino Acid Salt systems at Process Conditions", Energy Procedia 37 (2013) pp. 233-240.

Extended European Search Report dated Jan. 5, 2018 in European Patent Application No. 15806638.1.

* cited by examiner

ABSORBENT SYSTEM AND METHOD FOR CAPTURING $CO_2$ FROM A GAS STREAM

TECHNICAL FIELD OF THE INVENTION

This invention relates to a liquid absorbent and a system for capturing acidic gases, such as carbon dioxide from an exhaust gas. The invention also relates to a method of capturing acid gases from an exhaust gas in a process plant. The exhaust gas may come from fossil fuel fired power stations, from natural gas streams, from blast furnace oven off-gases in iron/steel plants, from cement and fertilizer plant exhaust gas and from reformer gases containing $CO_2$ in mixtures with $H_2S$ and COS.

BACKGROUND OF INVENTION

The world is currently facing the challenge of global warming due to high levels of greenhouse gases particularly carbon dioxide emitted to the atmosphere. The key challenge is on reducing $CO_2$ emissions at low cost. Several technologies are being investigated and applied for the capture and separation of carbon dioxide from flue gas streams including solvent, chemical looping, oxy-combustion, sorbent and membrane. Each of these technologies has areas best suited for application.

The method to remove acid gases from a gas stream using solvent is a well-known art. Typical absorbent solutions such as amine, carbonate, ammonia or amino acid salt solutions are used to remove the acid gas. A simplified conventional layout of such an absorption plant includes the use of an absorber and a desorber where the solution is circulated in a continuous cycle where the absorbent liquid is contacted countercurrent with the upward flowing gas. A main issue with these processes, especially in cases of removal of $CO_2$ from low partial pressure flue gases, is the energy required for regenerating the absorbent in the desorber. Several technologies using the amine-based process have been developed including the conventional technology like the Fluor Econamine process which has been further improved to the Fluor Econamine FC Plus$^{SM}$ process. Other amine base processes include MHI/KEPCO's KS-1, 2, and 3 (sterically hindered amines); Cansolv® Absorbent DC101™ (tertiary amines with a promoter); HTC Purenergy's mixed amine solvent and IFP's DMX. Promoted and un-promoted carbonate based process such as the Benfield process has also been developed and used mostly in the areas with medium to high pressures. An amino acid salt based process, The Alkazid process has earlier been developed developed by I.G. Farbenindustrie to remove $H_2S$ or mixtures of $H_2S$ and $CO_2$ and more recently, amino acid salt technology has also been developed by Siemens. A common challenge in all the existing processes, in particular the low pressure processes, is the high regeneration energy requirement. For absorption technology to be a viable alternative for $CO_2$ removal from exhaust gas stream, remarkable reductions in energy requirement for such technology in particular for $CO_2$ removal from post combustion exhaust gases are needed.

Several patents and patent applications related to the technology where amine, carbonate or amino acid based absorbents are used for acidic gas removal have been disclosed.

U.S. Pat. No. 1,990,217 teaches the use of a salt of an organic acid and an inorganic base for gas purification, while U.S. Pat. No. 2,176,441 teaches the use of a salt of amino acids and inorganic or organic bases whereby the amino acid should be derived from a primary, secondary or tertiary amine having at least two nitrogen atoms. US 2007/0264180 A1 discloses use of an absorbent solution comprising compounds capable of forming two separable phases by addition of an acid that is stronger than the acid compounds of the gaseous effluent to be treated: a first phase rich in acid compounds and a second phase poor in acid compounds wherein amine, amino acids or amino-acid alkaline salts are used as activators to favour absorption of compounds to be eliminated. The process includes acid neutralization of multiamines to form two phase liquid and a process for separation of the two phase liquid. AU-B-67247/81 describes the use of an aqueous scrubbing solution comprising a mixture of a basic salt, potassium carbonate, and an activator for the said basic salt comprising at least one, sterically hindered amine and a sterically hindered amino acid as a cosolvent for the sterically hindered amine. The amino acid here serves to prevent two phase separation of the aqueous solution at high temperatures.

BE 767,105 discloses a process for removing acid gases from gaseous streams by contacting the gaseous streams with a solution comprising potassium carbonate and an amino acid.

These above-described prior processes involve improvements of the traditional absorption/desorption cycle using liquid absorbents throughout the process.

WO 2012/030630 A1 teaches the use of a system comprising an amine and/or amino acid salt capable of absorbing the $CO_2$ and/or $SO_2$ to produce a $CO_2$- and/or $SO_2$-containing solution; an amine regenerator to regenerate the amine and/or amino acid salt; and, when the system captures $CO_2$, an alkali metal carbonate regenerator comprising an ammonium catalyst capable of catalyzing the aqueous alkali metal bicarbonate into the alkali metal carbonate and $CO_2$ gas. This disclosure does not allow precipitation in the absorber. Precipitation is only allowed outside the absorber in the amine regenerator unit where a concentrated alkali carbonate is used to regenerate the amine/amino acid salts while producing alkali bicarbonate precipitate.

Solid precipitation in the absorber is typically avoided in most processes for $CO_2$ removal, mainly because of potential plugging problems. WO 03/095071 A1 discloses a concept for the use of slurries from precipitating amino acid salt for $CO_2$ capture. U.S. 2010/0092359 A1 discloses a method for capturing $CO_2$ from exhaust gas in an absorber, wherein the $CO_2$ containing gas is passed through an aqueous absorbent slurry. The aqueous absorbent slurry comprises an inorganic alkali carbonate, bicarbonate and at least one of an absorption promoter and a catalyst. $CO_2$ is converted to solids by precipitation in the absorber. Said slurry having the precipitated solids is conveyed to a separating device, in which the solids are separated off, essentially all of at least one of the absorption promoter and catalyst is recycled together with the remaining aqueous phase to the absorber.

WO 2013/053853 A1 discloses a method for regeneration of bicarbonate slurry formed in a carbonate process.

The object of the present invention is to provide an absorbent system and method that improves carbon dioxide removal efficiency when compared with conventional amine, absorbent from organic acid neutralized with inorganic base carbonate based and ammonia absorbent systems.

SHORT DESCRIPTION OF THE INVENTION

The present invention provides an absorbent for capturing $CO_2$ from an exhaust gas comprising an aqueous absorbing mixture of at least an amine and a fast reacting amino acid salt, wherein the amine is selected from high bicarbonate forming amines, the mixture forms precipitates during $CO_2$ absorption in the absorber.

Preferably, the high bicarbonate forming amines are sterically hindered and/or are tertiary amines. Examples of preferred amines are: 2-amino-2-methylpropanol (AMP), 2-amino-2-methyl-1,3-propanediol (AMPD), 2-(diethylamino)-ethanol(DEEA), N,N-dimethylethanolamine (DMMEA) and methyl diethanolamine (MDEA), triethanolamine (TEA), 1-(diethylamino)-2-propanol, 3-(diethylamino)-1-propanol, tripropylamine, 2-pyrrolidinoethanol, 3-(diethylamino)-1,2-propanediol, N-piperidineethanol, 1-methylpiperidine-2-ethanol, 1-piperidinepropanol.

Amino acid salts are products of neutralization between an amino acid and an inorganic base or an organic base. In the present invention, the amino acid preferably has a $pKa \geq 9$.

Examples of suitable amino acids are glycine, taurine, sarcosine, proline, alanine, lysine, serine, pipecolinic acid, arginine, threonine and cysteine.

Examples of suitable inorganic bases are potassium hydroxide (KOH), sodium hydroxide (NaOH), lithium hydroxide (LiOH).

Examples of organic bases are amines selected from amines with $pKa \geq 9$, said amines include methylaminopropylamine (MAPA), piperazine (PZ), N-2-hydroxyethylpiperazine, N-(hydroxypropyl)piperazine, diethanol triamine (DETA), 2-((2-aminoethyl)amino)ethanol (AEEA), piperidine, pyrrolidine, dibutylamine, trimethyleneimine, 1,2-diaminopropane and 1,3-diaminopropane, N-2-hydroxyethylpiperazine, N-(hydroxypropyl)piperazine, monoethanolamone (MEA), diethanolamine (DEA), diisopropanolamine (DIPA), 3-aminopropanol (AP), 2,2-dimethyl-1,3-propanediamine (DMPDA), 3-amino-1-cyclohexylaminopropane (ACHP), diglycolamine (DGA), 1-amino-2-propanol (MIPA), 2-methyl-methanolamine (MMEA) and piperidine (PE).

The aqueous absorbent mixture comprises from 0.5 to 8.0 mol/kg of the fast reacting amino acid salt, and preferably from 1 to 4 mol/kg. The aqueous absorbent mixture comprises from 0.5 to 10.0 mol/kg of the amine, preferably from of 1.0-6.0 mol/kg.

The aqueous absorbent mixture comprises from 10 to 85% water.

Another aspect of the invention is a system for capturing $CO_2$ from an exhaust gas comprising:
(a) an absorber having at least two sections, or alternatively two absorbers in series, containing the absorbent according to the invention, wherein a first precipitate of amine bicarbonates is formed in a first section and optionally a second precipitate of metal bicarbonates is formed in a second section;
(b) a flash regenerator wherein the first precipitate of amine bicarbonates is dissolved, and $CO_2$ is released,
(c) a desorber wherein the aqueous absorbent mixture of the amine and the fast reacting amino acid salt is regenerated, and $CO_2$ is released, and
(d) a reboiler for supplying heat to the desorber.

Precipitation occurs in two steps, the first precipitation of amine bicarbonate complex occurs at an earlier stage in $CO_2$ absorption and the first precipitate is withdrawn at the end of the first absorber section and conveyed through a cross heat exchanger to a flash regenerator where the precipitate dissolves with $CO_2$ release. A low grade heat can be used in the flash regenerator. A second precipitation of metal bicarbonate complex occurs at the end of the second absorber section or a $CO_2$ rich absorbent system at the end of the second section is conveyed through a second cross heat exchanger to the absorbent regeneration unit/desorber. The heat of regeneration is supplied through a reboiler and the hot lean absorbent is used as pre-heater for the $CO_2$ rich slurries withdrawn from the first and second sections of the absorber. The lean absorbents from the flash regenerator and the desorber are remixed and returned to the top of the absorber to continue the cycle wherein the $CO_2$ released from the flash regenerator and the desorber is collected and sent to compression. When there are two absorbers, a slurry of amine bicarbonate complexes from the first absorber is passed through a solid-liquid separator from which the more concentrated slurry is conveyed to the flash generator where the precipitate dissolves with $CO_2$ release. The liquid phase is returned to the top of the second absorber in a countercurrent manner with the upcoming gas stream to continue $CO_2$ absorption.

When the system contains two absorbers, it further comprises a solid-liquid separator from which the more concentrated slurry is conveyed to the flash regenerator and from which the liquid phase is returned to the top of the second absorber section in a countercurrent manner with the upcoming gas stream to continue $CO_2$ absorption.

The inventive absorbent system improves carbon dioxide removal efficiency due to its higher $CO_2$ removal ability per cycle when compared with conventional amine, absorbent from organic acid neutralized with inorganic base and carbonate based absorbent system. It exhibits less solvent vaporisation loss because part of the absorbent is in salt form.

The present invention also provides a method of capturing $CO_2$ from an exhaust gas in a process plant comprising:
passing the exhaust gas through an absorber containing the absorbent of the invention,
enhancing precipitation of a first precipitate of amine bicarbonates in a first section of the absorber forming a first rich $CO_2$ absorbent slurry,
withdrawing the rich absorbent slurry from the first section to a flash regenerator, in which the first precipitate of amine bicarbonates is dissolved, and $CO_2$ is released,
obtaining a rich $CO_2$ liquid absorbent in a second section of the absorber,
conveying the rich $CO_2$ liquid absorbent from the second section to a desorber,
wherein the rich $CO_2$ liquid absorbent is heated resulting in release of $CO_2$ and a hot lean absorbent to be recycled to the absorber.

The slurry withdrawn from the first absorption section is heated to dissolve the precipitate with $CO_2$ release in the amine flash regeneration tank. The first precipitate may be heated by heat transfer with the hot lean absorbent coming from the desorber. Alternatively, the first precipitate may be regenerated in the flash regenerator by an available low grade heat in the process plant.

A second precipitate of metal bicarbonates may occur in the second section of the absorber and form a second rich $CO_2$ absorbent slurry. The slurry or the rich $CO_2$ liquid absorbent from the second section is withdrawn from the bottom of the absorber and sent to the regenerator for desorption with $CO_2$ release. The slurry or the rich $CO_2$ liquid absorbent from the second section may be passed through a second heat exchanger to be heated by heat transfer with the hot lean absorbent from the desorber.

The lean amine and amino acid salt mixture from the flash regenerator and desorber are preferably mixed and returned to the top of the absorber.

When two absorbers are used, slurry of the first precipitate from the first absorber section is passed through a solid-liquid separator from which the more concentrated slurry is conveyed to the flash regenerator. The first precipitate dissolves with $CO_2$ release in the flash regenerator, and the liquid phase will be returned to the top of the second absorber section in countercurrent manner with the upcoming gas stream to continue $CO_2$ absorption.

FIGURES

DETAILED DESCRIPTION OF THE INVENTION

Figure 1:
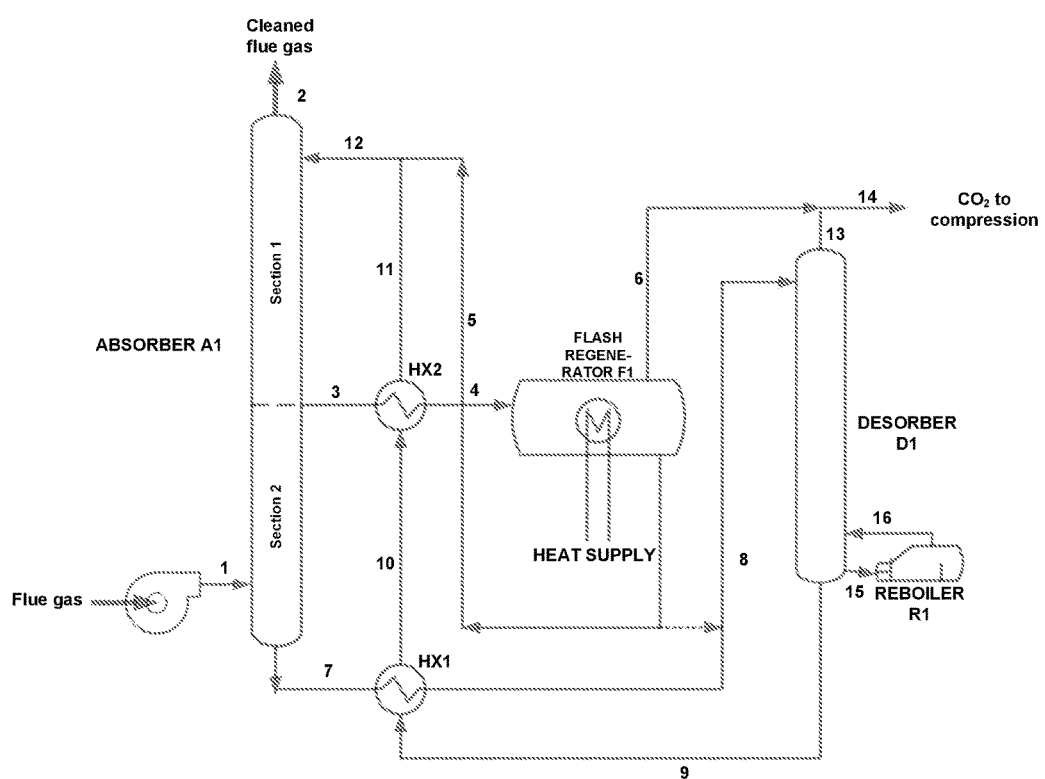
FIG. 1 is a simplified sketch of the slurry-slurry process for $CO_2$ capture.

The present invention came out of the desire of the inventors to shorten the time required for the formation of solid precipitate in certain amino acid salt systems and increase the absorption rate of such system. Precipitation of $CO_2$ as solid in a process will increase the $CO_2$ driving force into the liquid and result in increased loading capacity. Certain amino acid salt systems such as potassium sarcosinate have very good absorption kinetics, (Aronu U E, Ciftja A F, Kim I, Hartono A ; Understanding precipitation in amino acid salt systems at process conditions, Energy procedia 37 (2013) 233-240), but formation of solid potassium bicarbonate ($KHCO_3$) occurs very late at the point when the absorption kinetic is very slow making it unfavorable precipitating system candidate since the benefit of precipitation at process condition cannot be fully exploited. The inventors therefore searched for a method to enhance early precipitation for such a system. It is known that certain amines, such as 2-amino-2-methylpropanol (AMP), at high $CO_2$ loading or high concentration can precipitate in a process. An absorbent that can make the fast reacting amino acid salt to form an early precipitate will be ideal. Various blends of this AMP and different amino acid salt solutions were therefore prepared and $CO_2$ absorption behavior monitored in rapid screening set up with a possibility to monitor the precipitation behavior at process conditions. It was also found that in some cases the mixture of the amino acid salt and AMP forms a complete homogeneous mixture, while in other cases the solution separates into two phases before $CO_2$ absorption. The solution forming two phases gradually reverts to a single phase as $CO_2$ absorption progresses before precipitation sets in. As $CO_2$ absorption proceeded, and it was found that solid precipitation occurred early when the reaction rate is still very high, and it was found that the morphology of the precipitate is not the same as that of the metal bicarbonate, $KHCO_3$. The morphology which was crosschecked by using X-Ray Diffraction (XRD) analysis, conforms to that of the bicarbonate of the amine, AMP. Further, as the experiment continued at a later stage a new type of crystals forming in the mist of the first crystals was found. These second crystals were found to be $KHCO_3$ by using XRD. The first precipitate requires low temperature dissolution and amine regeneration with $CO_2$ release, while a higher temperature dissolution and absorbent regeneration is required in the desorber for the second stage precipitate. A test of the dissolution temperature of the precipitates shows that the first precipitate dissolves from 50° C. and completely with $CO_2$ release at 75° C., while the second precipitate dissolves from 70° C. to 100° C. An example of an overall initial reaction is described in Eq. 1:

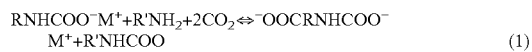
$$RNHCOO^-M^+ + R'NH_2 + 2CO_2 \Leftrightarrow {}^-OOCRNHCOO^-M^+ + R'NHCOO \quad (1)$$

The overall stepwise reaction in such a system can be described as follows:

Step 1: Formation of Solid Precipitate of Amine Bicarbonate

$$R'NH_2 + CO_2 \Leftrightarrow R'NHCOO \quad (2)$$

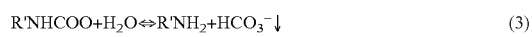
$$R'NHCOO + H_2O \Leftrightarrow R'NH_2 + HCO_3^- \downarrow \quad (3)$$

Step 2: Formation of Solid Precipitate of Metal Bicarbonate

$$RNHCOO^-M^+ + CO_2 \Leftrightarrow {}^-OOCRNHCOO^-M^+ \quad (4)$$

$${}^-OOCRNHCOO^-M^+ + H_2O \Leftrightarrow {}^-OOCRNH_2 + MHCO_3 \downarrow \quad (5)$$

R and R' represent hydrogen, $C_{1-4}$alkyl, $C_{1-4}$alkanol, or a straight chain, cyclic or aromatic amine groups, wherein at least one of R and R' is an $C_{1-4}$alkyl, $C_{1-4}$ alkanol or a straight chain, cyclic or aromatic amine group, wherein the straight chain contains up to 7 carbon atoms, and the cyclic or aromatic amine groups contain from 3 to 6 carbon atoms. M can be selected from K, Li or Na The amino acid salt used in the present invention is the product of neutralization between an amino acid and an inorganic base or organic base. The amino acids that can be used include but are not limited to glycine, taurine, sarcosine, proline, alanine, lysine, serine, pipecolinic acid, arginine, threonine and cysteine.

The inorganic bases that can be used for amino acid neutralization in the present invention include but are not limited to potassium hydroxide, sodium hydroxide and lithium hydroxide.

The organic bases that can be used for amino acid neutralization include amines; such amines include but are not limited to: methylaminopropylamine (MAPA), piperazine (PZ), N-2-hydroxyethylpiperazine, N-(hydroxypropyl)-piperazine, diethanol triamine (DETA), 2-((2-aminoethyl) amino)ethanol (AEEA), piperidine, pyrrolidine, dibutylamine, trimethyleneimine, 1,2-diaminopropane, 1,3-diaminopropane, 2-amino-2-methylpropanol (AMP), 2-(diethylamino)-ethanol(DEEA), 3-amino-1-cyclohexylaminopropane (ACHP), 3-aminopropanol (AP), 2,2-dimethyl-1,3-propanediamine (DMPDA), 1-amino-2-propanol (MIPA), 2-methyl-methanolamine (MMEA), piperidine (PE), monoethanolamone (MEA), diethanolamine (DEA), diisopropanolamine (DIPA).

Where an organic base such as amine is used for amino acid neutralization, it is preferred that the pKa of the amine is at least greater than the pKa of amino acid used.

The amine blended with the amino acid salt is preferably a strong or high bicarbonate forming amine like a sterically hindered and/or a tertiary amine. Such amines include but are not limited to 2-amino-2-methylpropanol (AMP), 2-amino-2-methyl-1,3-propanediol (AMPD), 2-(diethylamino)-ethanol(DEEA), N,N-dimethyl-ethanolamine (DMMEA), methyl diethanolamine (MDEA), triethanolamine (TEA), 1-(diethylamino)-2-propanol, 3-(diethylamino)-1-propanol, tripropylamine, 2-pyrrolidino-ethanol, 3-(diethylamino)-1,2-propanediol, N-piperidineethanol, 1-methylpiperidine-2-ethanol and 1-piperidinepropanol.

In FIG. 1, a simplified process diagram of the method used to capture $CO_2$ using the absorbent according to the invention is disclosed. The $CO_2$-containing gas stream 1 enters the absorber A1 in the bottom and flows upwards. It meets a liquid absorbent stream 12 in two stages. At the first contact stage in section 2, at the bottom of the absorber A1, stream 12 is a stream containing a slurry of water, a mixture of the metal bicarbonate of amine (Li, Na, or K); carbamates of amine, amino acid; amino acid salt and amine. At the second contact stage in section 1 of A1, at the point of withdrawal of stream 3, stream 12 is stream containing a slurry of water, a mixture of the bicarbonate of amine; carbamate of amine, amino acid; amino acid salt and amine. This implies that at each point of contact the aqueous phase is partially or fully saturated with the bicarbonates such that the flow contains both solids and liquid. In addition to the bicarbonates, the aqueous solution contains a precipitation promoting amine and an absorption rate promoting amino acid salt or a precipitation promoting amino acid salt and an absorption rate promoting amine.

Figure 2:
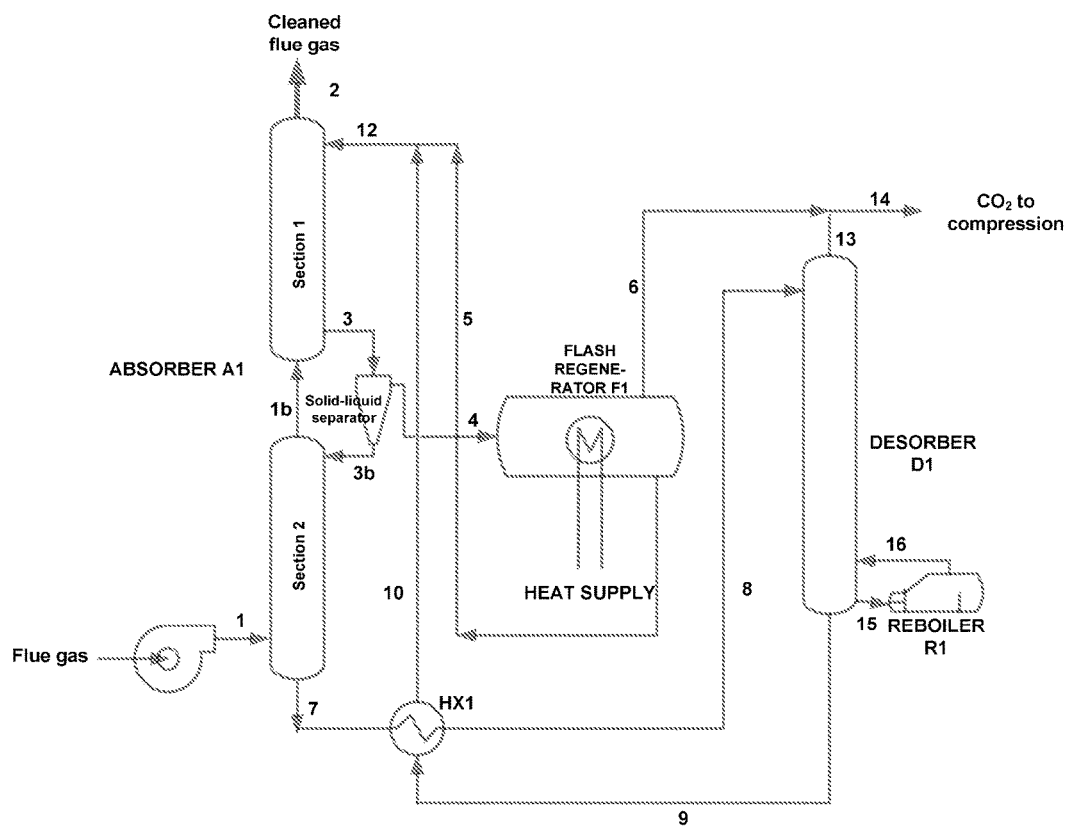
FIG. 2 is a simplified sketch of the slurry-slurry process for $CO_2$ capture with two separate absorber sections.

In FIG. 2, where the two sections of absorber A1 are in two different columns, $CO_2$-containing gas stream 1b from absorber section 2 enters the bottom of absorber section 1 and flows upwards in contact with the downward flowing stream 12. The withdrawn slurry, stream 3 is passed through a solid-liquid separator where more concentrated slurry, stream 4 is sent to the flash regenerator, while the liquid phase, stream 3b is returned to the absorber section 2 for contacting the upcoming $CO_2$-containing gas stream 1.

The operating temperature of the absorber will depend on the inlet flue gas temperature and will typically be from 30° C. to 80° C., preferably from 40° C. to 60° C. Further cooling or pre-treatment of the flue gas may be required to remove/reduce fly ash in cases with high temperature and water content, some cooling and water removal might be necessary. Some cooling may be required in the bottom region of section 1 before withdrawal of stream 3 to further enhance solid precipitation in this region. The stream 3 region in the absorber is preferably maintained at 30° C. to 50° C. In the absorber, the $CO_2$ is absorbed into the aqueous slurry and the exhaust, stream 2 with reduced $CO_2$ content leaves the absorber, after a water wash section. This water wash is only needed to retain the amine, depending on its volatility. The absorption tower is preferably a plate tower that can handle slurries. A spray tower, packed tower or any other suitable tower able to handle slurries can also be used. In the aqueous phase, the additional reactions described in Eq. 2 and 3 take place in section 1 before the withdrawal of stream 3 while the additional reactions described in Eq. 4 and 5 takes place in section 2 before the withdrawal of stream 7 at the bottom of the absorber.

The entering stream 12 will typically be high in amino acid salt and amine content. During contact with $CO_2$, the fast reacting amino acid salt enhances the transport of gaseous $CO_2$ into the liquid absorbent. The $CO_2$ in the liquid phase is further stored away into the amine as bicarbonate. As the gas liquid contact continues down the absorber, amine bicarbonate formed grows until the solubility limit is exceeded resulting in precipitation as solid amine bicarbonate slurry in the bottom of section 1, where the bicarbonate slurry is withdrawn as stream 3 at a temperature from 30° C. to 60° C. Withdrawal of stream 3 has a significant benefit; complete withdrawal of $CO_2$ saturated slurry from the absorber will shift equilibrium further to the right enhancing more $CO_2$ containing liquid phase products. The slurry withdrawal will also significantly reduce the viscosity of the absorbent system at this stage. This combined effect will accelerate mass transport of $CO_2$ into the liquid phase even at the middle of the absorption resulting in enhanced absorption capacity. Further, a withdrawal of the first precipitate from the solution as stream 3 will result in a less volume of solution for regeneration in the desorber. The amino acid salt containing $CO_2$ in low proportion and amine saturated with $CO_2$ as carbamate and/bicarbonate will remain in solution and continue contacting $CO_2$ in the absorber section 2. Ability of the amino acid salt for fast reaction with $CO_2$ and increased gas to liquid in this section allows further uptake of $CO_2$ along the absorber in section 2 forming more amino acid carbamate, which undergoes hydrolysis to produce $KHCO_3$ as in Eq. 5. At the solubility limit, $KHCO_3$ will precipitate and form a slurry containing amine bicarbonate/carbamate as well as amino acid carbamate/amino acid. This second stage precipitation in absorber section 2 will also result in another absorption rate and capacity enhancement since $CO_2$ bound as precipitate will not participate in the equilibrium backpressure over the solution. Depending on the flue gas temperature, the slurry leaves the bottom of the absorber as stream 7 at a temperature from 40 to 70° C. The slurry in stream 7 is passed through the cross exchanger HX1 and is heated up like in a conventional amine process by heat transfer with the lean absorbent stream 9 from the desorber. According to the invention, the filtration and/or crystallization often proposed for a precipitating process is not required. The slurry is sufficiently saturated with solids and a smaller liquid volume will be treated in the desorber because part of the total liquid has been withdrawn as stream 3 as precipitate slurry. The heated slurry stream 8 is delivered into the desorber D1 from the top where the solid precipitate is completely dissolved with $CO_2$ released in stream 13. $CO_2$ desorption is enhanced on further contact with upcoming stripping vapour from a reboiler R1. The precipitate in the slurry may be completely dissolved before in enters the reboiler through stream 15 depending on the desorber operating conditions. Hot vapour from the desorber is returned into the bottom of the desorber column by stream 16. The typical temperature range in the desorber is 100° C. to 200° C. In the desorber the $KHCO_3$ decomposes with $CO_2$ release likewise the bicarbonate/carbamate of the amine and amino acid resulting in the regeneration of the amino acid salt and amine in the absorbent.

The desorber can be a packed tower, a plate tower, a spray tower, a flash tank or any other suitable tower.

Stream 9 emerges the cross changer as stream 10 with lower temperature 60° C. -110° C. but with sufficient heat to transfer at the cross exchanger HX2 to stream 3. Stream 3 emerges from HX2 as stream 4 at higher temperature 60-110° C., sufficient to completely dissolve the precipitate and further strip off $CO_2$ from the liquid phase. The stream 4 is fed into the flash regenerator F1 where $CO_2$ is released in stream 6 and combined with stream 13 to form stream 14 containing $CO_2$ for storage. In addition, it could be possible to use some waste/low heat streams to heat up stream 3 and/or 4. $CO_2$ pressure for compression will vary significantly based on the mode of operation of the desorber. The produced $CO_2$ pressure can be in the range 3-50 bar. Stream 10 emerges from HX2 as stream 11 at lower temperature and is combined with stream 5, lean absorbent from the flash regenerator, F1 to form stream 12; the lean absorbent is returned to the top of the absorber A1. Stream 5 can also be combined with stream 8 delivered into the desorber D1. The process can also be configured such that the lean stream 9 is first used to heat up stream 3 in HX2 before using it to heat up stream 7 in HX1.

EXAMPLE 1

Absorption test experiments were carried out on a 7 mol/kg solution containing 3 mol/kg potassium sarcosine (KSAR) and 4 mol/kg 2-amino-2-methylpropanol (AMP) charged in a jacket glass reactor. The reactor is equipped with Particle Vision and Measurement (PVM) and Focused Beam Reflectance Measurement (FBRM) probes for monitoring precipitation. Absorption at 40° C. starts after calibration of $CO_2$ analyser with $CO_2$-$N_2$ gas mixture containing 10 vol % $CO_2$ with flow rate 2.5 NL.min$^{-1}$. Same gas mixture is then bubbled through a 375 mol/kg of the absorbing solution while the solution is agitated using a stirrer at 300 rpm. The gas phase leaving the reactor is cooled and $CO_2$ content is analysed online by IR. The absorption test gives fast relative comparison of absorption rate, it also allows the possibility to study the precipitate behaviour, crystal formation and dissolution during the experiment. The absorption process terminates when the concentration of $CO_2$ in the effluent reaches 9.5 vol % representing about 9.5 kPa partial pressure of $CO_2$ or when the absorption rate becomes too low. A liquid sample containing both the rich liquid and precipitated crystal is collected for analysis at the end of absorption. In addition, a similar sample is collected, filtered and dried for precipitate analysis by XRD. Precipitate dissolution was monitored by heating up the solvent in the range 40° C. to 90° C. while bubbling pure $N_2$ gas at 2.25 NL/min through the solution in the reactor bottle. It was observed that the $CO_2$ content of the effluent gas increases as $N_2$ bubbles through the solution while the precipitate dissolution is monitored and logged. Gas phase analysis was used to determine the liquid phase $CO_2$ concentration during the experiment.

EXAMPLES 2-3

An absorption experiment was carried out in the same manner as in Example 1, except that a 7 mol/kg solution containing 3mol/kg potassium glycine (KGLY) and 4 mol/kg 2-amino-2-methylpropanol (AMP) as an absorbent was used as an absorbing solution in Example 2. This absorbent was found to form two liquid phase before $CO_2$ absorption, but forms one phase as the loading progresses before precipitation start. In example 3, a 7 mol/kg solution containing 3 mol/kg sodium glycine (NaGLY) and 4 mol/kg 2-amino-2-methylpropanol (AMP) was the absorbent used. The results obtained are shown in Table 1.

COMPARATIVE EXAMPLES 1-3

An absorption experiment was carried out in the same manner as in Example 1, except that an aqueous solution containing 5 mol/kg potassium sarcosine (KSAR) as an absorbent in comparative example 1 while in comparative example 2-3 aqueous solution containing 4 mol/kg 2-amino-2-methylpropanol (AMP) and 4.9 mol/kg of monoethanolamine (MEA) was used, respectively.

From the result in Table 1, it can be seen that the type of absorbent used in Examples 1-3 forms more than one precipitate before absorption is terminated at 9.5 vol % $CO_2$ out of the reactor. Here precipitation occurred in two steps. In comparative example 1-2, it can be observed that only one precipitate is formed. In addition, it can be observed when looking at the absorption rate that the first precipitate in Example 1-3 occurs when the absorption rate is still high and the loading is low, and the second precipitate occurs when the absorption rate is low and loading is high. In the comparative example 1-2, the only precipitate occurs when the absorption rate is low and the loading is high. In the comparative example 3, no precipitate is formed.

EXAMPLE XRD

Figure 3:
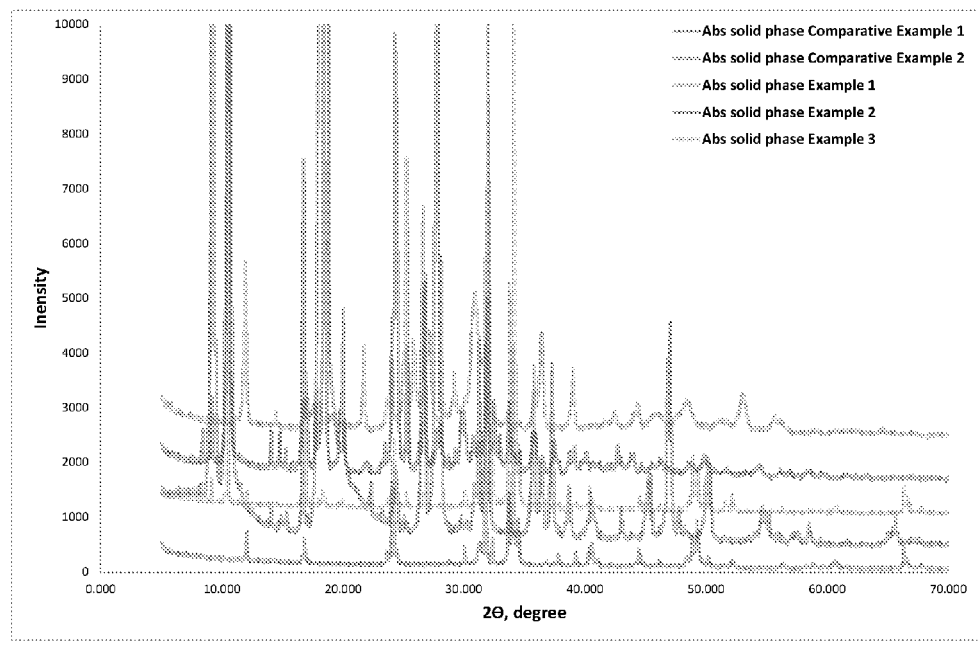
FIG. 3 shows XRD analysis result.

The slurry formed after absorption experiment was filtered and the filtrate dried at room temperature. X-ray diffraction (XRD) analysis was conducted on the filtered solid cake. The XRD analysis results are shown in FIG. 3. The filtrate from the comparative example 1 was identified as $KHCO_3$ by XRD analysis, while the filtrate from comparative example 2 is identified as the bicarbonate of AMP. From the figure, it can be observed that the solid phase spectra of Example 1 and 2 contain spectra of comparative example 1 and 2 at variable degrees. This shows that two precipitate types are found in the solution and these two precipitates are a mixture containing the precipitate of comparative example 1 and 2. During visual observation and monitoring using PVM, the experiment shows that the first precipitate in Example 1 and 2 is needle-like as was observed in comparative example 2. The spectra confirm that formation of first precipitate of AMP bicarbonate and as loading further increases a second precipitate, $KHCO_3$ is formed. The absorption solid phase of Example 3 appears somewhat different from the rest of the spectra. Although two precipitation stages occurred, precipitates with different morphology are formed. Example 3 is the only solution containing sodium salt; the other precipitates contain potassium salt.

TABLE 1

|  | Amino acid salt [mol/kg] | Amine [mol/kg] | Initial abs rate [mol/m3/min] | 1st Precipitation | | 2nd Precipitation | | Loading [molCO2/kg] | Crystal Dissolution Start (° C.) |
|---|---|---|---|---|---|---|---|---|---|
|  |  |  |  | Absorption rate [mol/m3/min] | Loading [molCO2/kg] | Absorption rate [mol/m3/min] | Loading [molCO2/kg] |  |  |
| Example 1 | 3 m KSAR | 4 m AMP | 34.3 | 29.6 | 0.81 | 6.5 | 2.54 | 3.06 | 55 |
| Example 2 | 3 m KGLY | 4 m AMP | 25.5 | 19.0 | 0.99 | 9.2 | 2.62 | 3.34 | 50 |
| Example 3 | 3 m NaGLY | 4 m AMP | 23.0 | 23.2 | 0.30 | 7.7 | 2.07 | 2.39 | 65 |
| Comparative Example 1 | 5 m KSAR |  | 36.0 | 3.9 | 2.89 |  |  | 3.23 |  |
| Comparative Example 2 |  | 4 m AMP | 13.4 | 3.9 | 1.91 |  |  | 2.39 |  |
| Comparative Example 3 |  | 4.9 m MEA | 24.3 |  |  |  |  | 2.68 |  |

EXAMPLE VLSE

Figure 4:
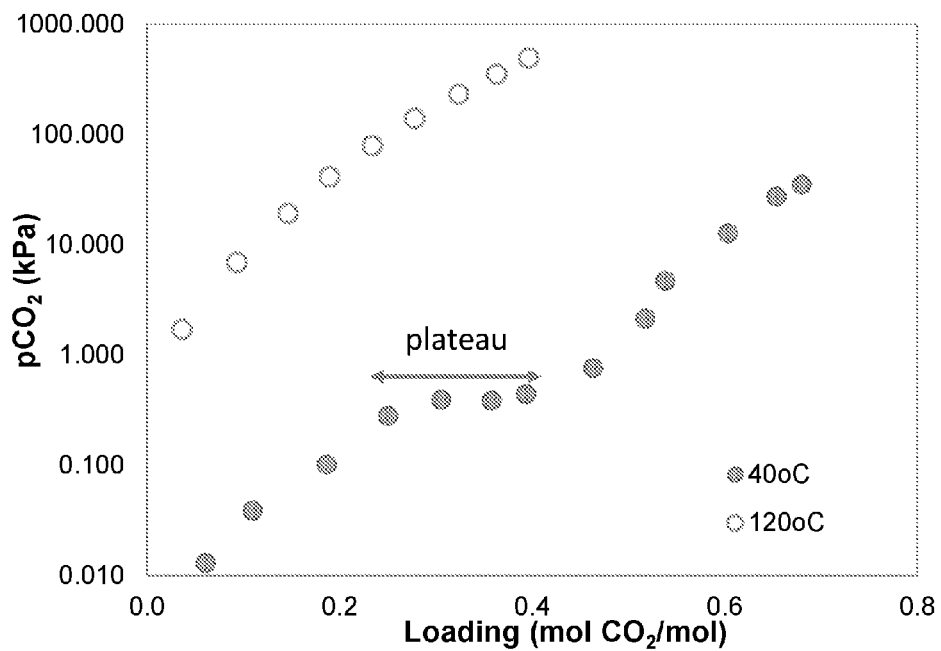
FIG. 4 shows an example vapour liquid solid equilibrium (VLSE) at 40° C. and 120° C.

An example vapour liquid solid equilibrium (VLSE) at 40 and 120° C. is shown in FIG. 4 for a precipitating absorbent according to the invention. The figure shows that precipitate formation enables increase in the driving force of $CO_2$ into solution with the formation of a 'flat plateau region' at 40° C. where the increase in $CO_2$ loading does not result in a corresponding increase in $CO_2$ partial pressure. This enables higher $CO_2$ loading in this precipitating system when compared to systems that do not precipitate.

The invention claimed is:

1. A system for capturing $CO_2$ from an exhaust gas comprising:
   (a) an absorber having at least two sections containing an absorbent,
      wherein the absorbent consists of an aqueous absorbing mixture consisting of 0.5 to 10.0 mol/kg of 2-amino-2-methylpropanol, 0.5 to 8.0 mol/kg an amino acid salt of sarcosine or glycine, and water,
      wherein a first section of the absorber is configured to form a first precipitate of amine bicarbonates,
      wherein a second section of the absorber is configured to form a second precipitate of metal bicarbonates,
      wherein the first section comprises an outlet configured to remove a slurry comprising the first precipitate of amine bicarbonates from the first section, and
      wherein the second section comprises an outlet configured to remove a slurry comprising the second precipitate of metal bicarbonates from the second section,
   (b) a flash regenerator configured to dissolve the first precipitate of amine bicarbonates and release $CO_2$,
   (c) a desorber configured to regenerate the aqueous absorbing mixture and release $CO_2$, and
   (d) a reboiler configured to supply heat to the desorber.

2. The system according to claim 1, wherein the two sections are two sections within one absorber or are two separate absorbers in series.

3. The system according to claim 1, wherein the outlet in the first section is configured to remove the slurry of the first precipitate of amine bicarbonates from the first section and supply the slurry of the first precipitate of amine bicarbonates to the flash generator.

4. The system of according to claim 1, further comprising a first heat exchanger (HX1) arranged between the absorber and the desorber.

5. The system of according to claim 1, further comprising a second heat exchanger (HX2) arranged between the absorber and the flash regenerator.

6. The system according to claim 1, wherein the absorbent consists of an aqueous absorbing mixture consisting of 1.0 to 6.0 mol/kg of 2-amino-2-methylpropanol, 1 to 4 mol/kg an amino acid salt of sarcosine or glycine, and water.

* * * * *